No. 839,926. PATENTED JAN. 1, 1907.
P. G. GRIFFITH.
METHOD OF EFFECTING THE DESTRUCTION OF PATHOGENIC ORGANISMS
IN WATER OR OTHER LIQUIDS.
APPLICATION FILED JUNE 3, 1905.
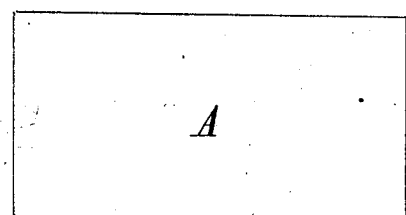
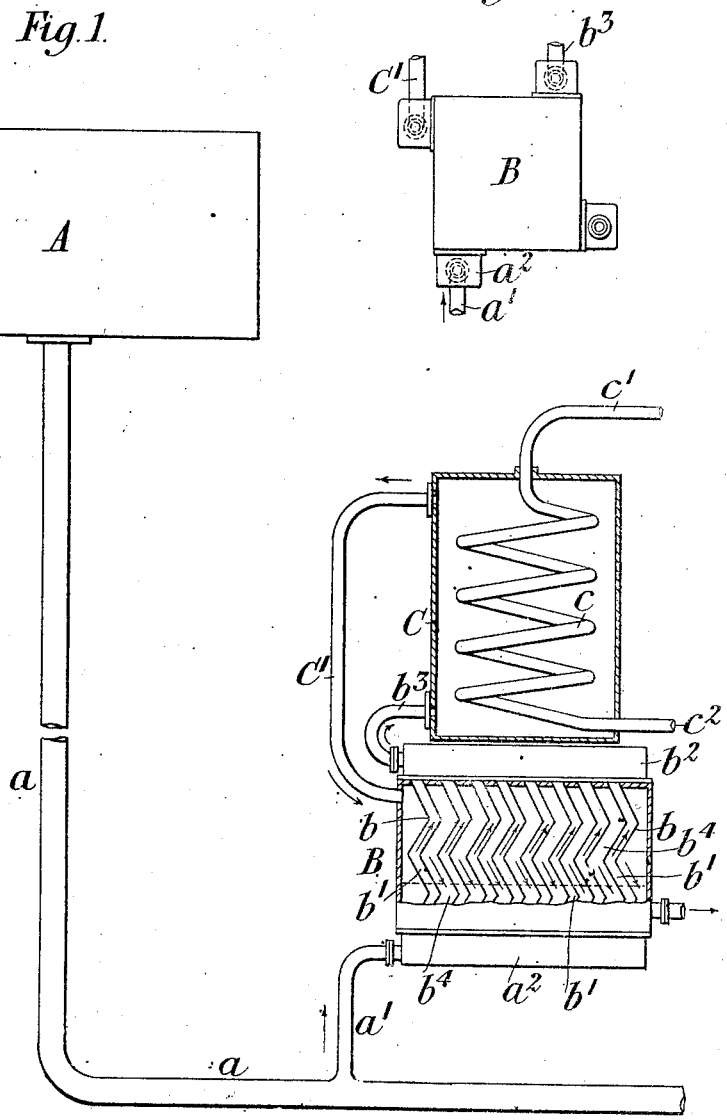

UNITED STATES PATENT OFFICE.

PATRICK GILL GRIFFITH, OF LONDON, ENGLAND.

METHOD OF EFFECTING THE DESTRUCTION OF PATHOGENIC ORGANISMS IN WATER OR OTHER LIQUIDS.

No. 839,926.  Specification of Letters Patent.  Patented Jan. 1, 1907.

Application filed June 3, 1905. Serial No. 263,570.

*To all whom it may concern:*

Be it known that I, PATRICK GILL GRIFFITH, a subject of the King of Great Britain, residing at Villa Molitor, 636 Green Lanes, London, England, have invented a new and useful Method of Effecting the Destruction of Pathogenic Organisms in Water or other Liquids, of which the following is a specification.

This invention relates to the purification of water, and is more particularly intended for use in connection with systems of water-supply for towns, districts, communities, corporations, and other areas or bodies.

The object of my invention is to effect the destruction of pathogenic organisms in the water or other liquid, and thereby prevent the more common disease germs, typhoid and the like, being conveyed through such systems to the recipients and consumers of the water.

According to my invention the water is raised to a temperature of 65° centigrade to 85° centigrade for a period not exceeding twenty-five seconds. This heating has the effect of destroying such pathogenic microorganisms as commonly exist and are conveyed by the water.

In order that my invention may be clearly understood and readily carried into effect, I will proceed to describe the same with reference to the accompanying drawings, which represent diagrammatically a means whereby the objects hereinbefore mentioned may be accomplished, Figure 1 being a partial elevation and vertical section illustrating the arrangement of the apparatus, and Fig. 2 an end view of the chamber in which the water or liquid is received and from which the treated water or liquid is delivered.

According to the mode of carrying my invention into effect, described by way of example, I propose to convey the water to be treated by means of suitable conduits, such as pipes $a$ from a head of water, which may be a tank, such as A, situated at a suitable elevation, to one or more chambers or receptacles B, which are preferably lagged or surrounded with some material which is a bad conductor of heat, the water reaching the said chambers B by way of branch pipes $a'$ and heads $a^2$. These chambers are provided with tubes or closely-associated plates $b\ b$, of copper or other suitable metal or material, forming passages $b'\ b'$ for the water, the latter passing, preferably, upwardly through the said tubes or passages in the said chambers and being led from thence by way of the head $b^2$ and pipe $b^3$ into receptacles C, adapted to raise the temperature thereof to the required degree. The heating-receptacles may comprise series of tubes $c$ or the like suitably arranged for conveying the full effect of the heating means, which may be steam, fire, or other convenient medium, to the water circulating therethrough.

In the example illustrated it is assumed that steam is the heating medium employed and that same enters the tube or coil $c$ by way of the pipe $c'$ and leaves the tube or coil by way of the pipe $c^2$. After being thus raised in temperature the water is conveyed back to the first-mentioned chambers B in such a manner—say by way of pipes $C'$—that it is caused to flow by gravitation along the exterior surfaces of the tubes or passages $b'$, conveying the untreated water to the heating-receptacles—that is to say, the treated water flows by way of the passages $b^4$ through the said chambers B. With a view to increasing the transference of heat from the treated to the untreated or from the outgoing to the ingoing water the tubes or plates $b$ are preferably of bent, curved, zigzag, or any other tortuous or crooked form, so as to retard the progress of the water along their surfaces. The outgoing or treated water is hereby cooled or deprived of its heat by the water which feeds the heaters without actual contact therewith, while the heat given off from the heated water in the passages $b^4$ is taken up by the water circulating through the tubes or passages $b'$ from the supply-tank A, a considerable economy in heating resulting and great expedition in the deprivation of the treated water of the heat contracted thereby in the heating-receptacle C.

Although in the foregoing description I have referred to a series of chambers and receptacles and the consequent plurality of heads and conducting-pipes, for the sake of clearness I have illustrated but one set of the appliances necessary for carrying out the invention. It will, however, be readily understood that the various pipes or appliances may be provided, as may be required, with means, such as valves or other devices, for regulating or cutting off the supply or otherwise varying the system in its actual working as circumstances or requirements may demand or the fancy of the operator may dictate. The temperature hereinbefore referred to and the period of time during which the water or other liquid is exposed thereto is found in practice, however, to be fatal to the existence of the common pathogenic organisms.

Having now described my invention, what I claim as new, and desire to secure by Letters Patent, is—

1. The herein-described method of purifying water or other liquids, consisting in raising the water or other liquid to a temperature of 65° centigrade to 85° centigrade for a period not exceeding twenty-five seconds, for the purpose specified.

2. The herein-described method of uninterruptedly purifying water or other liquids, consisting in raising the water or other liquid to a temperature of 65° centigrade to 85° centigrade for a period not exceeding twenty-five seconds and in causing the treated or outgoing water or other liquid to impart heat to the untreated or ingoing water or other liquid, substantially as described.

3. The herein-described method of purifying water or other liquid consisting in maintaining the water or other liquid at a temperature below a sterilizing temperature for a period of substantially twenty-five seconds, for the purpose specified.

4. The herein-described method of uninterruptedly purifying water or other liquids, consisting in raising the liquid to a temperature of between 65° centigrade and 85° centigrade for a period approximating twenty-five seconds, and maintaining a continuous flow of the liquid into and out from the heating zone, substantially as described.

In witness whereof I have hereunto set my hand in presence of two witnesses.

PATRICK GILL GRIFFITH.

Witnesses:
F. C. HAWTIN,
WALTER J. SKERTEN.